Sept. 15, 1925.
M. MOELLER
1,553,789
RADIATION PYROMETER
Filed Feb. 1, 1924
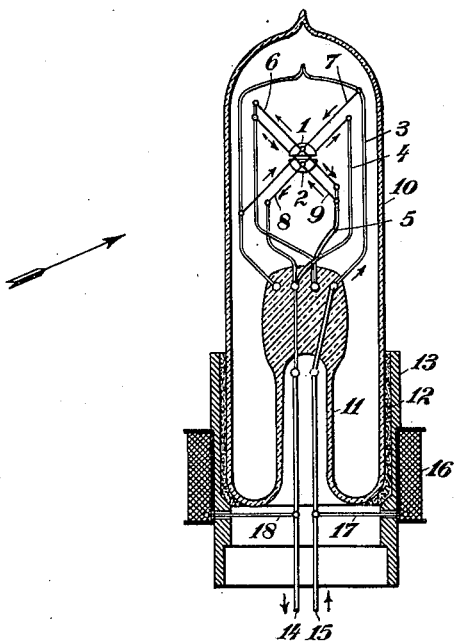
*Inventor*:
Max Moeller
by Knight Bros
*attorneys*

Patented Sept. 15, 1925.

1,553,789

UNITED STATES PATENT OFFICE.

MAX MOELLER, OF BERLIN, GERMANY, ASSIGNOR TO SIEMENS & HALSKE, AKTIEN-GESELLSCHAFT, OF SIEMENSSTADT, NEAR BERLIN, GERMANY, A CORPORATION OF GERMANY.

RADIATION PYROMETER.

Application filed February 1, 1924. Serial No. 689,988.

*To all whom it may concern:*

Be it known that I, MAX MOELLER, a citizen of the German Empire, residing at Berlin, Germany, have invented certain new and useful Improvements in Radiation Pyrometers, of which the following is a specification.

My invention relates to radiation-pyrometers, or appliances for measuring the temperature of a body by means of its radiation of heat by the agency of one or a plurality of thermo-elements constituting thermo-couples. In the known apparatus of this kind the thermo-elements are generally arranged in a vacuum, for instance in an evacuated glass bulb, because thereby the transmission of heat of the thermo-elements to the outer atmosphere is avoided and therefore the electromotive force of the element increased. The readings of such measuring instruments depend, however, to a large degree upon the temperature of the glass vessel enclosing the thermo-elements and of the casing or frame, i. e. upon the surrounding temperature, which is frequently subject to considerable fluctuations. In a vacuum the exchange of heat of the hot soldered or brazed junction with the surroundings takes place almost exclusively by radiation. It has hitherto not always been possible to compensate the errors in the readings of such thermo-elements, for instance by compensating connections as their properties depend linearly only upon the temperature. The use of air fillings for the containers of thermo-elements is not feasible because, owing to the comparatively great conductivity of air, the sensitiveness of the instrument is considerably impaired.

According to my invention the thermo-element is surrounded by a gas of such heat conductivity and coefficient of temperature, that the exchange of heat between the hot soldered or brazed junction and the surroundings takes place for the larger part by heat conduction in approximately linear relation to the temperature, the gas pressure being chosen so low, that convection currents are avoided as far as possible. As a rule such gases are employed, whose heat conductivity is smaller than that of the air and whose coefficient of temperature is approximately equal to that of the air. Argon gas has proved particularly suitable for this purpose.

The accompanying drawing illustrates an embodiment of my invention and shows the details of construction.

Referring to this drawing it will be seen, that between the long approximately rectangularly bent wire frame 3 and the shorter supporting wire forks 4 and 5 four thin wires 6, 7, 8, 9 are stretched. The wires 6, 7 and 8, 9 are respectively soldered to each other at their points of intersection located substantially midway between their ends, the solderings being indicated by small circles. Upon each soldered junction is soldered a small plate 1 and 2 of semi-circular shape made, for instance, of platinum. The two plates are arranged in any suitable manner such that they complement each other to a circular disc facing the direction of the arriving rays. The heat rays, emanating from the object to be investigated, are directed against these two half disks and thus against the soldered junctions. The large arrow to the left of the figure perspectively indicates the arriving heat rays, though in practice special concentrating means for the rays are employed. This particular feature however has no bearing on the present invention and has therefore been omitted from the drawings. The supporting frame wires 3, 4, 5 are melted at their lower ends into the glass socket 11. The shank 14 of the wire fork 5 and shank 15 of the wire fork 4 are carried through the glass socket 11 and serve for connecting the current measuring instruments, not shown. The two thermo-elements with their supporting frame are arranged within the glass bulb 10, which is preferably filled with argon. The glass bulb 10 is fixed in a metal holder 13 between which and the bulb an insulating layer 12, for instance of porcelain, is disposed.

The drawing shows the thermo-couples seen from the side on which the soldering points are located, indicating as previously stated by small circles on the plates 1 and 2. The two wires, which form one of the thermo-couples, for instance the nickel chromium wire 6 and the constantan wire 7 are soldered together on plate 1 midway between their ends. Therefore counting from this middle point of the wires the two halves of each wire may be connected in parallel. The two halves of the nickel chromium wire 6 lead from disk 1 to the supporting fork 4. The two halves of the constantan wire 7 lead from disk 1 to wire frame 3. In the second thermo-couple the two halves of the constantan wire 9 lead from disk 2 to the supporting fork 4. The two halves of the nickel chromium wire 8 lead from disk 2 to the supporting fork 5. The thermo-couple wires are connected with their respective supporting elements in such manner that the two thermo-couples are placed in series such as is indicated by the arrows. Thus the current runs from disk portion 1 through the two halves of the nickel chromium wire 6 to the fork 4, thence through the two halves of the constantan wire 9 to the disk half 2, thence through both halves of the nickel chromium wire 8 to supporting fork 5 and to the terminal wire 14 which may for instance lead to the positive pole of a galvanometer (not shown here). Thence the circuit returns through inlead 15 which constitutes the negative pole of the pole system to the supporting frame 3 and over the two halves of the constantan wire 7 back to the disk half 1.

Should in cases in which the temperature of the casing attains very high values or in which particularly great accuracy is required, the heat radiation increase to a considerable extent, the error caused by it may be compensated in known manner, for instance by a heat sensitive shunt resistance 16, disposed upon the holder 13. The ends of the resistance are connected by the wires 17, 18 with the wires 14, 15. The shunt resistance compensates the drops of electromotive force of the thermo-couple caused by the heating of the cold junctions.

The invention may, if desired, also be applied to such instruments, in which the temperature fluctuations of the hot soldered junctions are only employed as a means to indicate other changes. As an example may be mentioned the measuring of a current intensity by means of the heat developed by the current when passing the hot soldered junction of a thermo-couple.

It will be understood that the elements may be supported within the glass bulb and connected in any other suitable manner.

Other modifications within the scope of the claims will suggest themselves to those skilled in the art. What I claim as my invention and desire to secure by Letters Patent is:—

1. In a pyrometer of the character described, the combination of at least one thermo-couple, a vessel containing said couple and being filled with a gas having a heat conductivity smaller than that of air and having a coefficient of temperature near that of air, said thermo-couple having a small plate connected to its hot junction, said plate adapted to receive a part of the heat rays of the body to be measured.

2. In a pyrometer of the character described, the combination of two thermo-couples electrically connected together, a vessel containing said couples and being filled with a gas having a heat conductivity smaller than that of air and having a coefficient of temperature near that of air, two semicircular shaped plates, each plate being connected to the hot junction of one of said thermo-couples, both plates being arranged with respect to the arriving heat rays to be measured, so that each plate receives an individual portion of the total of the rays.

3. In a pyrometer of the character described, the combination of a thermo-couple, a glass vessel containing said couple and being filled with a gas having a heat conductivity smaller than that of air and having a coefficient of temperature near that of air, a small plate connected to the hot junction of said thermo-couple for receiving a part of the heat rays of the body to be measured, a socket arranged at the base of said vessel, a plurality of supporting wires for said thermo-couple fixed to said socket, a metal holder for said vessel and a shunt resistance for said thermo-couple, supported by said holder, said shunt resistance being adapted to compensate the drop of electromotive force of said thermo-couple caused by the indirect heating of the cold junctions of said thermo-couple.

In testimony whereof I affix my signature.

MAX MOELLER.